(12) United States Patent
Liu et al.

(10) Patent No.: US 9,118,256 B2
(45) Date of Patent: Aug. 25, 2015

(54) POWER STARTING CIRCUIT

(71) Applicant: Chervon (HK) Limited, Wanchai (HK)

(72) Inventors: Lei Liu, Nanjing (CN); Huaishu Wang, Nanjing (CN)

(73) Assignee: Chervon (HK) Limited (HK)

( * ) Notice: Subject to any disclaimer, the term of this patent is extended or adjusted under 35 U.S.C. 154(b) by 394 days.

(21) Appl. No.: 13/647,983

(22) Filed: Oct. 9, 2012

(65) Prior Publication Data

US 2013/0100718 A1   Apr. 25, 2013

(30) Foreign Application Priority Data

Oct. 20, 2011   (CN) .......................... 2011 1 0318834

(51) Int. Cl.
*H02M 1/36* (2007.01)
*H01F 27/42* (2006.01)

(52) U.S. Cl.
CPC ........................................ *H02M 1/36* (2013.01)

(58) Field of Classification Search
USPC ......................................................... 307/412
See application file for complete search history.

(56) References Cited

U.S. PATENT DOCUMENTS

2007/0138993 A1*   6/2007   Tanaka et al. ................. 318/762

\* cited by examiner

*Primary Examiner* — Robert Deberadinis
(74) *Attorney, Agent, or Firm* — Greenberg Traurig, LLP

(57) ABSTRACT

A power starting circuit used in a DC power supply circuit has a double-pole, double-throw switch electrically connected to a positive pole of a DC power supply and controls a conducting state of the circuit. A first capacitor provides a voltage signal for a first switch circuit and controls the conducting state of the first switch circuit in a continuous charging and discharging process. The first switch circuit controls the conducting state of the DC power supply circuit. A maintaining signal input end provides a maintaining signal for the first capacitor. The power starting circuit can achieve an over discharge protection function for the control circuit. Moreover, when the switch is turned on, it can automatically switch the circuit off so as to save power if the electrical product does not need to continue to work.

12 Claims, 3 Drawing Sheets

POWER STARTING CIRCUIT

RELATED APPLICATION INFORMATION

This application claims the benefit of CN 201110318834.3, filed on Oct. 20, 2011, the disclosure of which is incorporated herein by reference in its entirety.

BACKGROUND

The following generally relates to a power starting circuit and, more particularly, to a power starting circuit for controlling a DC power supply.

As shown in FIG. 1, a currently known power starting circuit used in a hand-held power tool comprises: a switch SW11 having a first position end electrically connected to the positive pole of a DC power DC10 (the DC power DC10 is a battery pack) and a second position end electrically connected to a diode D11, a resistor R13 and a transistor Q11 respectively. The diode D11 and the resistor R13 are electrically connected to a resistor R11, a resistor R12, a transistor Q12 and a resistor R14 to form a switching circuit 100 for controlling the conducting state of an output end 11. When the switch SW1 is turned off, if the voltage of the battery pack 10 is higher than the break-over voltage of the diode D11, the transistor Q12, Q11 are on, and the circuit is started; if the voltage of the battery pack 10 is lower than the break-over voltage of the diode D11, the transistor Q12, Q11 are off, and the power supply is stopped to prevent the over discharge of the battery, wherein the break-over voltage of the diode D11 is close to the over discharge protection voltage of the battery pack 10. In the operation process, the currently known starting circuit can achieve an over discharge protection function of the battery, but it can not achieve a power saving function by automatically turned-off when the power of the battery is sufficient but not be used.

SUMMARY

The object of the invention is to provide a power starting circuit to achieve an over discharge protection function of the circuit and switch off the power supply of the circuit automatically to save power when the electric product does not need to work. In order to achieve the above object, the power starting circuit of the present invention used in a DC power supplying circuit comprises:

a double-pole, double-throw switch electrically connected to the positive pole of a DC power supply and controlling the conducting state of the circuit;

a first capacitor electrically connected to the double-pole, double-throw switch;

a first switch circuit for controlling the conducting state of the DC power supply circuit; and a maintaining signal input end for providing a maintaining signal for the first capacitance.

In a preferred embodiment, the first capacitor is electrically connected to the double-pole, double-throw switch by a second capacitor for current limiting.

In a preferred embodiment, the first switch circuit comprises a third resistor having one end electrically connected to the double-pole, double-throw switch; a fourth resistor having one end electrically connected to the other end of the third resistor; a first transistor having a collector electrically connected to the other end of the fourth resistor; a fifth resistor having one end connected to a base of the first transistor and the other end electrically connected to the double-pole, double-throw switch; a sixth resistor having one end connected to the base of the first transistor and the other end connected to ground; and a second transistor having an emitter electrically connected to the double-pole, double-throw switch, a base electrically connected to the one end of the fourth resistor, and a collector electrically connected to an output end.

In a preferred embodiment, the first resistor is electrically connected to a diode by a second switch circuit, and the second switch circuit comprises a third transistor, a second capacitor and a seventh resistor electrically connected to each other.

Compared with the prior art, the power starting circuit of the present invention can switch on the power firstly and then turn on the switch so that the product can work. Moreover, when the power is switched on, the present invention can switch off the power supply automatically so as to save the power if the product does not need to continue to work, and also can control the circuit to achieve an over discharge protection function.

DETAILED DESCRIPTION

Figure 1:
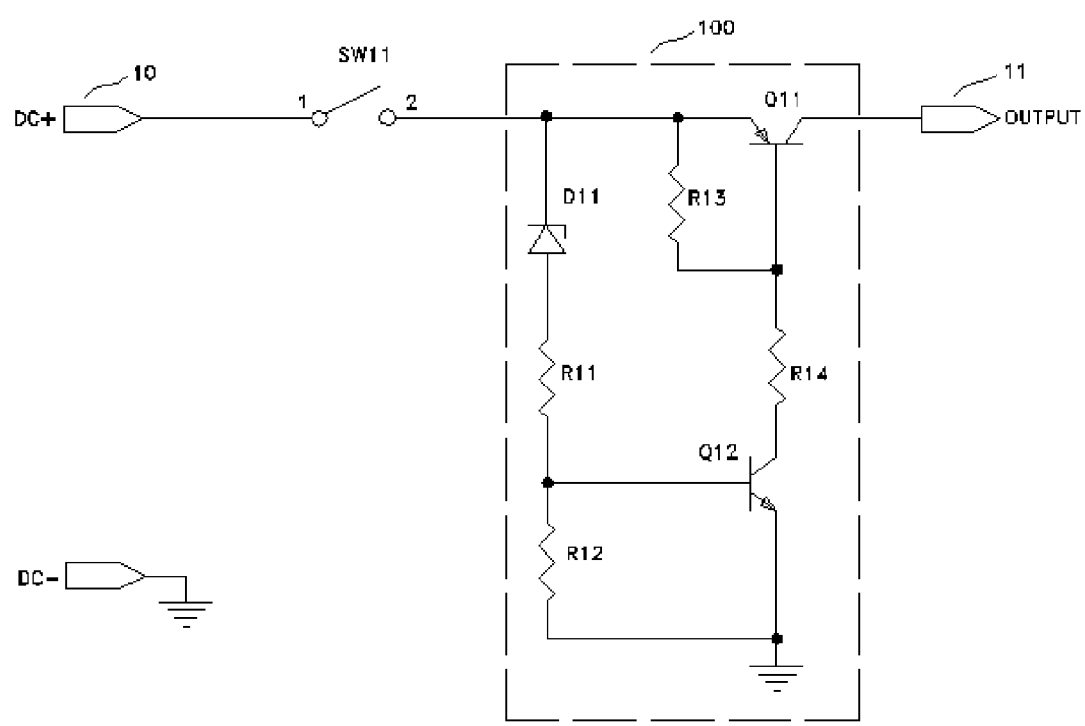
FIG. 1 shows the circuit diagram of the present power starting circuit.
Figure 2:
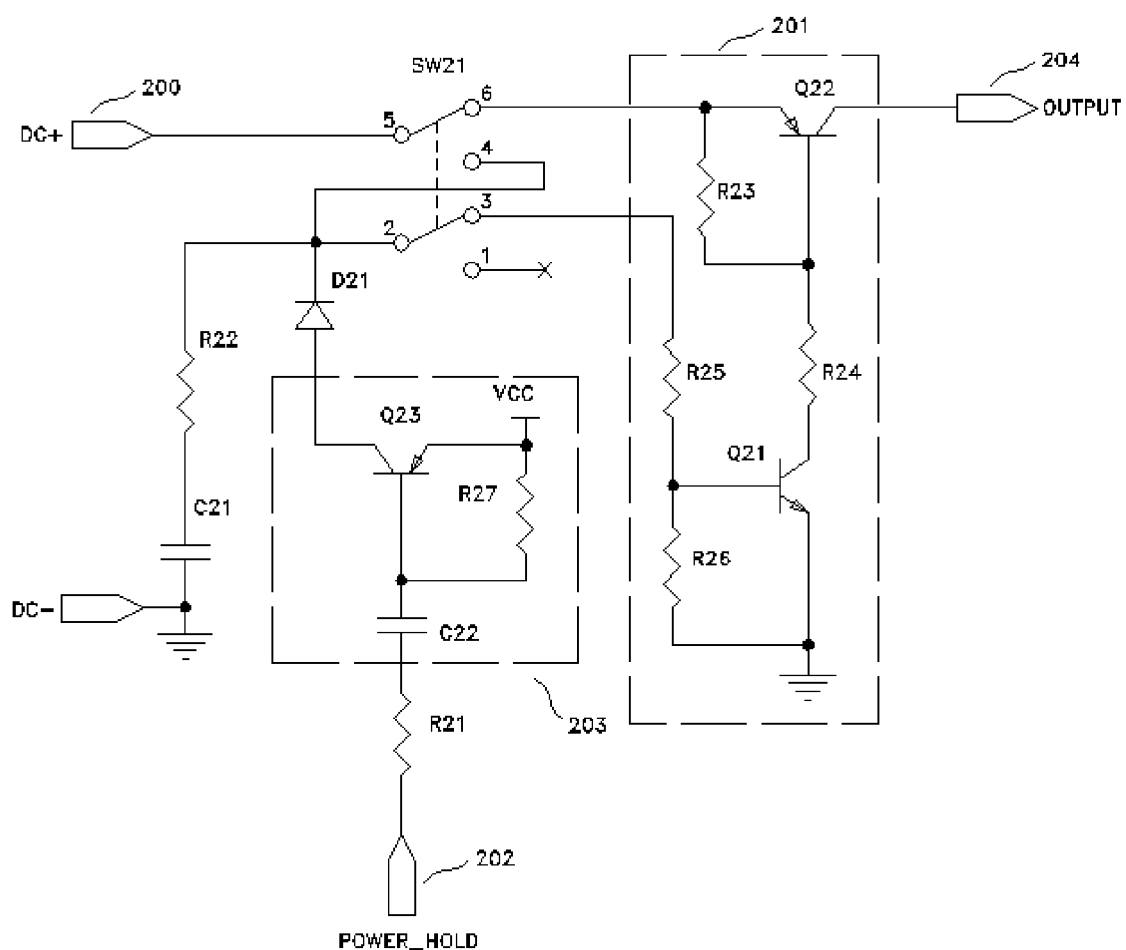
FIG. 2 shows the circuit diagram of the one preferred embodiment of the power starting circuit according to the present invention.

FIG. 2 shows a preferred embodiment of the power starting circuit according to the present invention. The power starting circuit used in the DC power supplying circuit may comprise:

a double-pole, double-throw switch SW21, which has a fifth position end electrically connected to the positive pole of a DC power supply DC200 and controls the conducting state of the whole circuit, wherein the DC power supply DC200 may be supplied by a battery pack or a AC power supply with a converter; a first capacitor C21, which is electrically connected to a second position end and a fourth position end of the double-pole, double-throw switch SW21 respectively by a second resistor R22, wherein the second resistor R22 works as a current-limiting resistor in the circuit and the first capacitor C21 provides a voltage for a first switch circuit 201;

where the first switch circuit 201 controls the conducting state of an output end 204 and wherein the first switch circuit 201 comprises a third resistor R23 having one end electrically connected to a sixth position end 6 of the double-pole, double-throw switch SW21; a fourth resistor R24 having one end electrically connected to the other end of the third resistor R23; a first transistor Q21 (for example, a NPN transistor) having a collector electrically connected to the other end of the fourth resistor R24; a fifth resistor R25 having one end connected to a base of the first transistor Q21 and the other end electrically connected to a third position end of the double-pole, double-throw switch SW21; a sixth resistor R26 having one end electrically connected to the base of the first transistor Q21 and the other end connected to the ground; and a second transistor Q22 (for example, a PNP transistor) having an emitter electrically connected to the sixth position end of the double-pole, double-throw switch SW21, a base electrically connected to the one end of the fourth resistor R24, and a collector electrically connected to an output end 204. When the double-pole, double-throw switch SW21 is switched to the second position, that is, when the fifth end is connected to the sixth end and the second end is connected to the third end, the first transistor Q21 is off, and no current flows between the collector and the emitter, thus no current flows between the collector and emitter of the second transistor Q22, so the second transistor Q22 is off and the first switch circuit 201 is off;

when the double-pole, double-throw switch SW21 is switched to the first position, that is, when the fifth end is connected to the fourth end and the second end is connected to the first end, the capacitor C21 is charged, and after charging, when the double-pole, double-throw switch SW21 is switched to the second position again, that is, when the fifth end is connected to the sixth end and the second end is connected to the third end, the first capacitor C21 provides a voltage for the fifth resistor R25, and current flows between the collector and emitter of the first transistor Q21, thereby the collector and emitter of the second transistor Q22 are on, thus current flows out from the output end 204;

a maintaining signal input end 202 electrically connected to the second resistor R22 by a first resistor R21 and a diode D21 for maintaining the power of the first capacitance C21. A second switch circuit 203 is provided between the first resistor R21 and the first diode D21. The second switch circuit 203 comprises a second capacitor C22 having one end electrically connected to the one end of the first resistor R21; a seventh resistor R27 having one end electrically connected to the other end of the second capacitor C22 and the other end electrically connected to a voltage VCC; a third transistor Q23 (for example, a PNP transistor) having a base electrically connected to the other end of the second capacitor C22, a collector electrically connected to one end of diode D21, and an emitter electrically connected to the voltage VCC. The maintaining signal input end 202 provides maintaining signal (POWER_HOLD) by an operational function module (not shown in the drawings) such as SCM, MCU or CPU. The maintaining signal may be an inversion level signal. The power of the first capacitor C21 is controlled by the second switch circuit 203, for example, when the operational function module halts, the maintaining signal input end 202 may input a fixed-level signal, thus the third transistor Q23 is off, and the first capacitor C21 can not be charged; when the power of the first capacitor C21 is too low, the first switch circuit 201 is off, thereby to achieve an automatic turn-off function of the whole circuit.

In the first preferred embodiment of the present invention, when switching the double-pole, double-throw switch SW21 to the second position (the fifth end is connected to the sixth end and the second end is connected to the third end) firstly and then switching on the circuit power, the first capacitor C21 is completely discharged by the second resistor R22, the fifth resistor R25 and the sixth resistor R26, thus after switching the power supply on, the first transistor Q21 and the second transistor Q22 are off, and no current flows out from the output end 204; when the double-pole, double-throw switch SW21 is firstly switched to the first position (the fifth end is connected to the fourth end and the second end is connected to the first end), the DC power supply DC200 charges the first capacitor C21, and the first capacitor C21 may be fully charged in a relative short time; when the double-pole, double-throw switch SW21 is switched to the second position again, the first capacitor C21 provides power for the fifth resistor R25, and current flows between the collector and the emitter of the first transistor Q21, thus the first transistor Q21 is on, so that the collector and the emitter of the second transistor Q22 are on, and the DC power supply DC200 provides power for the output end 204 through the fifth and sixth ends of the double-pole, double-throw switch SW21 and the second transistor Q22. During this process, the power of the first capacitor C21 is decreased gradually, but the operational function module (not showing in the drawings) would provide an inversion level signal for the maintaining signal input end 202, thus the voltage VCC charges the first capacitor C21 continuously so that the power of the first capacitor C21 can ensure that the first switch circuit 201 is on continuously.

It can be seen from the above embodiment that when the switch is switched from the first position to the second position, the whole circuit is on and the electrical product can work normally; when the switch SW21 is directly arranged in the second position and the circuit power is switched on, the first capacitor C21 does not have power and can not provide voltage for the first switch circuit 201 so that the first switch circuit 201 is off, thereby the whole circuit is off, thus it achieves another object of the present invention, that is, when the user firstly turns on the switch SW21 (i.e., the switch SW21 is arranged in the second position) and then switches the circuit power on, the whole circuit is off and the final electrical product cannot work normally so as to achieve an electrical protection function. That is to say, when the power of the electrical product is accidentally broken off in the using process, the user does not turn off the switch of the electrical product and the switch SW21 is always in the first position. At that time, the electrical product cannot work if it is powered again.

Additionally, the maintaining signal input end 202 is controlled by an operational function module to input inversion level signal, if the operational function module stops providing inversion level signal, the first capacitor C21 may interrupt the conduction of the first switch circuit 201 with the decrease of the power, thus the power starting circuit of the present invention may control the conducting state of the circuit by the double-pole, double-throw switch SW21 and the operational function module, that is to say, when the power circuit is on, it can switch the circuit power off so as to save power if the electrical product does not need to continue to work. Moreover, when the operational function module such as SCM halts, the maintaining signal input end 202 generally inputs a fixed-level signal, thus the third transistor Q23 is off, the first capacitor C21 cannot be charged, and the first switch circuit 201 is off, thereby the power of the whole circuit may be switched off when the operational function module halts so as to avoid over discharge of the DC power supply DC200.

Figure 3:
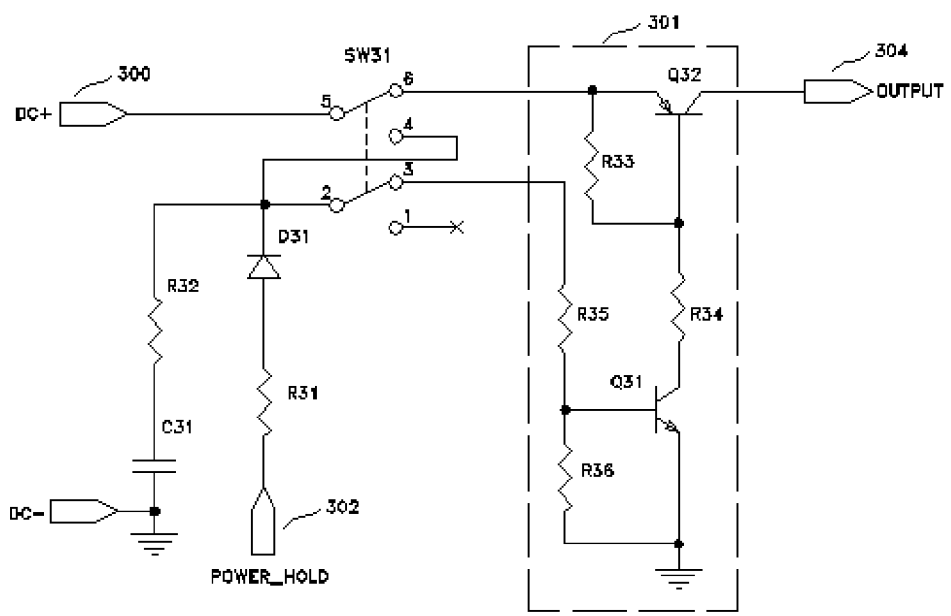
FIG. 3 shows the circuit diagram of the other preferred embodiment of the power starting circuit according to the present invention.

As shown in FIG. 3, in the power starting circuit according to the other embodiment of the present invention, when the first resistor R31 is electrically connected to the diode D31 directly, the maintaining signal input end 302 inputs a high level signal (i.e., the maintaining signal) by the operational function module so as to continuously charge the first capacitor C21, maintain the power of the first capacitor C21 and keep the first switch circuit 301 on. The second embodiment differs from the first embodiment in that the first resistor R31 is electrically connected to the diode D31 without the second switch circuit. The power starting circuit of the present invention may not achieve an automatic turn-off protection function for the circuit when the SCM halts. In contrast, it continues to provide level signal for the first capacitor C31 to keep the whole circuit on continuously.

The invention is not limited to the above embodiments. The person skilled in the art may easily conceive that in other embodiments, the first transistor Q21 and the second transistor Q22 in the first switch circuit 201 in the power starting circuit of the present invention may be replaced by a MOS- FET as the switch, which has the same operating principle as the embodiments of the present invention, thus it is unnecessary to go into details herein. Additionally, in other circuit applications, the double-pole, double-throw switch SW21 in the power starting circuit of the present invention may be replaced by a relay, but the relay has a higher cost than the double-pole, double-throw switch SW21. Therefore, the present invention has many embodiments which are intended to fall with the scope the claims set forth below.

What is claimed is:

1. A power starting circuit used in a DC power supplying circuit, wherein the power starting circuit comprises:
    a double-pole, double-throw switch for controlling the conducting state of the starting circuit such that, when the switch is in a first position, the starting circuit is off and a power supply charges a capacitor and, when the switch is in a second position, the capacitor triggers a first switch circuit on and the power supply provides power;
    wherein the capacitor provides a voltage signal for the switch circuit and controls the conducting state of the switch circuit in a continuous charging and discharging process;
    wherein the switch circuit controls the conducting state of the DC power supplying circuit; and
    wherein a maintaining signal input end provides a maintaining signal for the capacitor.

2. The power starting circuit according to claim 1, wherein a second switch circuit is arranged between the maintaining signal input end and the capacitor for continuously charging the capacitor.

3. The power starting circuit according to claim 2, wherein the maintaining signal input end is provided with a maintaining signal by an operational function module.

4. The power starting circuit according to claim 2, wherein the second switch circuit comprises a transistor, a capacitor and a resistor electrically connected to each other.

5. The power starting circuit according to claim 2, wherein the second switch circuit comprises a metal-oxide-semiconductor field-effect transistor (MOSFET), a capacitor and a resistor electrically connected to each other.

6. The power starting circuit according to claim 3, wherein the operational function module is one of a single chip microprocessor (SCM), a microcontroller (MCU) or a central processing unit (CPU).

7. The power starting circuit according to claim 3, wherein, when the operational function module halts, a fixed-level signal is output to the maintaining signal input end, so that the second switch circuit is off.

8. The power starting circuit according to claim 1, wherein the capacitor is electrically connected to the double-pole, double-throw switch by a resistor which is for limiting the current.

9. The power starting circuit according to claim 1, wherein the switch circuit comprises at least one resistor and at least one transistor.

10. The power starting circuit according to claim 9, wherein the switch circuit comprises:
    a third resistor having one end electrically connected to the double-pole, double-throw switch;
    a fourth resistor having one end electrically connected to the other end of the third resistor;
    a first transistor having a collector electrically connected to the other end of the fourth resistor;
    a fifth resistor having one end connected to a base of the first transistor and the other end electrically connected to the double-pole, double-throw switch;
    a sixth resistor having one end connected to a base of the first transistor and an other end connected to ground; and
    a second transistor having an emitter electrically connected to the double-pole, double-throw switch, a base electrically connected to one end of the fourth resistor, and a collector electrically connected to an output end.

11. The power starting circuit according to claim 10, wherein the first transistor is a NPN transistor.

12. The power starting circuit according to claim 10, wherein the second transistor is a PNP transistor.

* * * * *